(12) United States Patent
Kohr

(10) Patent No.: US 7,288,509 B2
(45) Date of Patent: Oct. 30, 2007

(54) COMPATIBILIZATION OF ESTERS WITH LATICES

(75) Inventor: Alan Wayne Kohr, Schwenksville, PA (US)

(73) Assignee: Rohm and Haas Company, Philadelphia, PA (US)

(*) Notice: Subject to any disclaimer, the term of this patent is extended or adjusted under 35 U.S.C. 154(b) by 15 days.

(21) Appl. No.: 11/410,620

(22) Filed: Apr. 25, 2006

(65) Prior Publication Data

US 2006/0241009 A1    Oct. 26, 2006

Related U.S. Application Data

(60) Provisional application No. 60/674,625, filed on Apr. 25, 2005.

(51) Int. Cl.
| | |
|---|---|
| C11D 1/83 | (2006.01) |
| C11D 1/68 | (2006.01) |
| C11D 3/37 | (2006.01) |
| C11D 3/43 | (2006.01) |
| C09G 1/04 | (2006.01) |

(52) U.S. Cl. .............. 510/214; 510/434; 510/475; 510/477; 510/488; 510/505; 528/271; 106/3; 106/11

(58) Field of Classification Search ........... 510/214, 510/434, 475, 477, 488, 505; 528/271; 106/3, 106/11
See application file for complete search history.

(56) References Cited

U.S. PATENT DOCUMENTS

| | | | |
|---|---|---|---|
| 3,770,684 A | 11/1973 | Singer et al. | |
| 4,460,734 A | 7/1984 | Owens et al. | |
| 6,228,913 B1 * | 5/2001 | Owens et al. | ............. 524/110 |

FOREIGN PATENT DOCUMENTS

| | | |
|---|---|---|
| JP | 80933 | 3/1994 |
| JP | 2004-107586 | 4/2004 |

* cited by examiner

*Primary Examiner*—Brian Mruk
(74) *Attorney, Agent, or Firm*—Carl P. Hemenway

(57) ABSTRACT

There is provided a composition comprising
(a) at least one aqueous polymer dispersion,
(b) at least one ester in the amount of 0.005 to 50 parts by weight of said ester, based on 100 weight parts of solids of all polymers in said aqueous composition, wherein said ester is selected from the group consisting of
 (i) a monoester of a C7-C10 aliphatic monocarboxylic acid with a dihydric alcohol,
 (ii) a monoester of a C7-C10 aliphatic monocarboxylic acid with a trihydric alcohol,
 (iii) a diester of a C7-C10 aliphatic monocarboxylic acid with a trihydric alcohol, and
 (iv) a mixture of two or more of said (i), (ii), and (iii), and
(c) at least one surfactant, in the amount of 1.2 to 10 parts by weight of said surfactant, based on 100 weight parts of solids of all polymers in said aqueous composition.

10 Claims, No Drawings

COMPATIBILIZATION OF ESTERS WITH LATICES

CROSS REFERENCE TO RELATED PATENT APPLICATIONS

This is a non-provisional application of U.S. provisional Application Ser. No. 60/674,625 filed on Apr. 25, 2005, now abandoned.

BACKGROUND

A wide variety of coating compositions (such as, for example, paints, paper coatings, and floor polishes) are desirably improved by including a leveling agent in the composition. For example, tributoxyethylphosphate has been used as a leveling agent in floor polish. However, some organophosphate compounds show neurotoxicity, so it is desired to find effective leveling agents other that organophosphates. Some leveling agents that have been described are as follows: Japanese Patent Publication (kokai) No. 206476/84 describes a polyalkoxylate of a linear aliphatic alcohol. Japanese Patent Publication (kokai) No. 80933/94 describes use of adipic acid esters as a leveling agent. Japanese Patent Publication (kokai) No. 315255/99 describes use of a cumarin or derivatives thereof as a leveling agent. In addition, Japanese Patent Publication (kokai) No. 2004-107586 describes improvement of leveling ability by combining a specific structured plasticizing agent and a polyoxyalkylene alkylether type nonionic surfactant.

However, it has been found that the effects of the publicly known leveling agents were not sufficient compared to the effects of tributoxyethylphosphate. It has been further found that the leveling effectiveness of tributoxyethylphosphate can be matched or exceeded by leveling agents that contain monoesters of C7-C10 aliphatic monocarboxylic acids with dihydric alcohols and/or monoesters or diesters of C7-C10 aliphatic monocarboxylic acids with trihydric alcohols.

It is further desired to improve the ease of making a coating composition by providing an effective, non-organophosphate leveling agent and an aqueous polymer dispersion in a single package. However, it has been found that unstable compositions result when some mixtures are made of useful aqueous polymer dispersions plus one or more monoesters of C7-C10 aliphatic monocarboxylic acids with dihydric alcohols and/or one or more monoesters or diesters of C7-C10 aliphatic monocarboxylic acids with trihydric alcohols. Such unstable compositions exhibit gel formation, coagulation, other undesirable effects, or combinations thereof. It is therefore desired to provide stable mixtures of useful aqueous polymer dispersions with such monoesters and/or diesters.

STATEMENT OF THE INVENTION

In a first aspect of the present invention, there is provided a composition comprising
(a) at least one aqueous polymer dispersion,
(b) at least one ester (herein called "ester (b)") in the amount of 0.005 to 50 parts by weight of said ester, based on 100 weight parts of solids of all polymers in said aqueous composition, wherein said ester is selected from the group consisting of
  (i) a monoester of a C7-C10 aliphatic monocarboxylic acid with a dihydric alcohol,
  (ii) a monoester of a C7-C10 aliphatic monocarboxylic acid with a trihydric alcohol,
  (iii) a diester of a C7-C10 aliphatic monocarboxylic acid with a trihydric alcohol, and
  (iv) a mixture of two or more of said (i), (ii), and (iii), and
(c) at least one surfactant, in the amount of 1.2 to 10 parts by weight of said surfactant, based on 100 weight parts of solids of all polymers in said aqueous composition.

In a second aspect of the present invention, there is provided a method of making a composition comprising
(A) making an ester-surfactant mixture comprising at least one ester and at least one surfactant, wherein the weight ratio of said surfactant to said ester is from 0.01 to 2, and wherein said ester is selected from the group consisting of
  (i) a monoester of a C7-C10 aliphatic monocarboxylic acid with a dihydric alcohol,
  (ii) a monoester of a C7-C10 aliphatic monocarboxylic acid with a trihydric alcohol,
  (iii) a diester of a C7-C10 aliphatic monocarboxylic acid with a trihydric alcohol,
  (iv) a mixture of two or more of said (i), (ii), and (iii), and
(B) admixing said ester-surfactant mixture with at least one aqueous polymer dispersion, wherein the amount of said ester in said composition is 0.005 to 50 parts by weight, based on 100 weight parts of solids of all polymers in said aqueous composition.

DETAILED DESCRIPTION

When a compound is described herein as ester of a certain carboxylic acid with a certain alcohol, it is to be understood that such a description refers to the structure of the ester and not necessarily to the method of making it. Such an ester may be made by reacting that certain carboxylic acid with that certain alcohol, or it may be made by any other method.

As used herein "(meth)acrylate" and "(meth)acrylic" mean, respectively, "acrylate or methacrylate" and "acrylic or methacrylic."

As used herein, a material is "aqueous" if that material contains at least 25% water by weight, based on the total weight of that material.

As used herein, a "dispersion" contains, sometimes among other ingredients, discrete particles that are suspended in a continuous medium. When the continuous medium contains at least 50% water by weight, based on the weight of the continuous medium, the dispersion is said to be an "aqueous dispersion," and the continuous medium is said to be an "aqueous medium." When at least some of the suspended discrete particles in the dispersion contain one or more polymers, the dispersion is said herein to be a "polymer dispersion." Thus, an "aqueous polymer dispersion" contains some polymer-containing particles suspended in a continuous medium that is at least 50% water.

The group of polymer particles in a sample of an aqueous polymer dispersion have a variety of sizes. In some cases, the polymer particles are spherical or nearly spherical; in such cases their sizes can usefully be characterized by their diameters, and the group of polymer particles can be usefully characterized by the average diameter of the particles. One useful method of measuring the average diameter of the particles is light scattering. In some embodiments, the average diameter of the particles is 80 nm or larger; or 100 nm or larger; or 125 nm or larger. Independently, in some embodiments, the average diameter of the particles is 1,000 nm or smaller; or 500 nm or smaller; or 250 nm or smaller. In some embodiments, the average diameter of the particles is smaller than 150 nm.

The present composition comprises 1) a monoester of (C7-C10) aliphatic monocarboxylic acid with dihydric alcohol, or 2) a monoester or a diester of (C7-C10) aliphatic monocarboxylic acid with trihydric alcohol. A total amount of 1) a monoester of (C7-C10) aliphatic monocarboxylic acid with dihydric alcohol, and 2) a monoester or a diester of (C7-C10) aliphatic monocarboxylic acid with trihydric alcohol comprised in the present composition is preferably 0.005 to 50 parts by weight, more preferably 0.01 to 20 parts by weight based on 100 parts by weight of polymer solids of the composition.

In the present invention, a monoester of (C7-C10) aliphatic monocarboxylic acid with dihydric alcohol can be a mixture of plural esters in which either a dihydric alcohol moiety of the monoester or a (C7-C10) aliphatic monocarboxylic acid moiety of the monoester are different, or both a dihydric alcohol moiety of the monoester and a (C7-C10) aliphatic monocarboxylic acid moiety of the monoester are different. A monoester or a diester of (C7-C10) aliphatic monocarboxylic acid with trihydric alcohol can be a mixture of plural esters in which either a trihydric alcohol moiety of the monoester or the diester or a (C7-C10) aliphatic monocarboxylic acid moiety of the monoester or the diester are different, or both a trihydric alcohol moiety of the monoester or the diester and a (C7-C10) aliphatic monocarboxylic acid moiety of the monoester or the diester are different. Both 1) a monoester of (C7-C10) aliphatic monocarboxylic acid with dihydric alcohol, and 2) a monoester or a diester of (C7-C10) aliphatic monocarboxylic acid with trihydric alcohol can be used in the present invention at the same time.

When a monoester or a diester of (C7-C10) aliphatic monocarboxylic acid with trihydric alcohol is used in the present invention, either the monoester or the diester can be used, or both the monoester and the diester can be used. When both the monoester and the diester are used in the present invention, a ratio of the monoester to the diester is not specifically restricted.

In the present invention, 1) a monoester of (C7-C10) aliphatic monocarboxylic acid with dihydric alcohol, or 2) a monoester or a diester of (C7-C10) aliphatic monocarboxylic acid with trihydric alcohol can be esters prepared by any publicly known process and esters which are commercially available. Unless it is contrary to the object of the present invention, a composition of the present invention can comprise a by-product which is produced upon production of 1) a monoester of (C7-C10) aliphatic monocarboxylic acid with dihydric alcohol, or 2) a monoester or a diester of (C7-C10) aliphatic monocarboxylic acid with trihydric alcohol. For example, when a monoester of (C7-C10) aliphatic monocarboxylic acid with dihydric alcohol is produced, a diester body can be produced. In this case, a composition of the present invention can comprise the diester body. When a mixture of a monoester and a diester of (C7-C10) aliphatic monocarboxylic acid with dihydric alcohol is used for the present invention, an amount of the monoester body in the mixture is, preferably, 60 mol % or more, more preferably, 80 mol % or more, and further more preferably, 90 mol % or more. Most preferably, an amount of the monoester body in the mixture is 100 mol %, i.e. the mixture is free from the diester body. In addition, when a monoester or a diester of (C7-C10) aliphatic monocarboxylic acid with trihydric alcohol is produced, a triester body can be produced. In this case, a composition of the present invention can comprise the triester body. When a mixture of the triester, and the monoester and/or the diester is used for the present invention, the total amount of the monoester body and the diester body is, preferably, 60 mol % or more, more preferably, 80 mol % or more, and further more preferably, 90 mol % or more. Most preferably, the total amount of the monoester body and the diester body is 100 mol %, i.e. the mixture is free from the triester body. When a by-product is produced upon production of the esters used for the present invention, the by-product can be deleted or reduced from a mixture of the interest esters and the by-product before the interest esters are used for the present invention.

In the present invention, dihydric alcohol and trihydric alcohol are not specifically restricted, and can be any publicly known dihydric alcohol and trihydric alcohol. A molecular weight of dihydric alcohol is preferably 5,000 or less, more preferably, 1,000 or less. For example, preferable dihydric alcohol can include ethylene glycol, diethylene glycol, triethylene glycol, propylene glycol, dipropylene glycol and tripropylene glycol. A molecular weight of trihydric alcohol is preferably 5,000 or less, more preferably, 1,000 or less. For example, preferable trihydric alcohol can include glycerol and trimethylol propane.

(C7-C10) aliphatic monocarboxylic acid is an aliphatic monocarboxylic acid which has from 7 to 10 of carbon atoms, and is not specifically restricted in the present invention. (C7-C10) aliphatic monocarboxylic acid can be either linear structure or branched structure. Preferably, aliphatic monocarboxylic acid is (C8-C9) aliphatic monocarboxylic acid. More preferably, aliphatic monocarboxylic acid includes isononanoic acid, i.e. 3,5,5-trimethyl hexanoic acid, and octyl acid, i.e. 2-ethyl hexanoic acid.

The practice of the present invention involves the use of an aqueous polymer dispersion. The aqueous polymer dispersion may be made by any method. In some embodiments, one or more polymers are made by any means and then processed in a way that removes most non-polymeric compounds (such as, for example, solvents, carriers, polymerization media, etc.) and puts the one or more polymers in the form of particles; in such embodiments, the particles may then be dispersed in water. In some embodiments, a polymer is made by a method that creates the polymer in the form of an aqueous polymer dispersion; such methods include, for example, aqueous suspension polymerization and aqueous emulsion polymerization. Also suitable for some embodiments are naturally occurring aqueous polymer dispersions such as, for example, natural rubber latex.

In some embodiments, the compositions of the present invention include an aqueous dispersion of one or more water insoluble emulsion polymers. As used herein, "emulsion polymers" are polymers made by emulsion polymerization; such a polymer is also called a "latex." In some embodiments in which an emulsion polymer is used, the polymer contains acid functional residues.

In some embodiments, the aqueous polymer dispersion further contains one or more polyvalent metal ion or complex crosslinking agents. For example, such aqueous polymer dispersions are disclosed in U.S. Pat Nos. 3,328,325, 3,467,610, 3,554,790, 3,573,329, 3,711,436, 3,808,036, 4,150,005, 4,517,330, 5,149,745, 5,319,018, 5,574,090 5,676,741.

The polymer or polymers in the aqueous polymer dispersion will be chosen to be appropriate for the intended use of the composition of the present invention. One important characteristic of a polymer is the glass transition temperature (Tg) as calculated by the Fox equation (T. G. Fox, Bull. Am. Phys. Soc. 1, 123 (1956)). For example, if the composition is intended to be used in an architectural coating, at least one polymer will desirably be chosen to have a Tg of 15° C. to 35° C.

In some embodiments, the composition of the present invention is intended to be used in a floor polish. Among such embodiments, the composition contains at least one polymer with Tg of at least 10° C., more preferably at least 40° C., calculated using the Fox Equation.

In some embodiments, the aqueous polymer dispersion contains one or more polymers formed from a monomer mix comprising 0% or up to 70%, preferably 10% to 50%, by weight of at least one vinyl aromatic monomer, based on the total weight of the monomer mix. Independently, in some embodiments, the aqueous polymer dispersion contains one or more polymers formed from a monomer mix containing 3% to 50%, preferably 5% to 20%, by weight of at least one acidic monomer, based on the total weight of the monomer mix. Independently, in some embodiments, the aqueous polymer dispersion contains one or more polymers formed from a monomer mix containing no more than 97%, preferably 30% to 97% and more preferably 30% to 70%, by weight of at least one monomer selected from the (C1-C20) alkyl (meth)acrylates, preferably the (C1-C12) alkyl (meth) acrylates, based on the total weight of the monomer mix. Also contemplated are embodiments in which the aqueous polymer dispersion contains one or more polymers formed from a monomer mix containing any combination of at least one vinyl aromatic monomer, at least one acidic monomer, and at least one (C1-C20) alkyl (meth)acrylate monomer.

Suitable vinyl aromatic monomer(s) include, for example, alpha, beta ethylenically unsaturated aromatic monomers, such as, for example, styrene, vinyl toluene, 2-bromo styrene, o-bromo styrene, p-chloro styrene, o-methoxy styrene, p-methoxy styrene, allyl phenyl ether, allyl tolyl ether, alpha-methyl styrene, and mixtures thereof.

Suitable acidic monomer(s) include, for example, alpha, beta monoethylenically unsaturated acids, such as, for example, maleic acid, fumaric acid aconitic acid, crotonic acid, citraconic acid, acryloxypropionic acid, acrylic acid, methacrylic acid, itaconic acid, and mixtures thereof. Acrylic acid and methacrylic acid and mixtures thereof are preferred. Methacrylic acid is the most preferred. Other acidic monoethylenically unsaturated monomers that may be copolymerized to form the water insoluble, film forming polymers are partial esters of unsaturated aliphatic dicarboxylic acids and the alkyl half esters of such acids. For example, the alkyl half esters of itaconic acid, fumaric acid, and maleic acid, wherein the alkyl group contains 1 to 6 carbon atoms, such as methyl acid itaconate, butyl acid itaconate, ethyl acid fumarate, butyl acid fumarate, and methyl acid maleate.

Suitable alkyl (meth)acrylate monomers include, for example, methyl methacrylate, methyl acrylate, ethyl acrylate, ethyl methacrylate, n-butyl acrylate, butyl methacrylate, iso-butyl methacrylate, 2-ethyl hexyl acrylate, n-octyl acrylate, sec-butyl acrylate, cyclopropyl methacrylate, and mixtures thereof.

In some embodiments, the aqueous polymer dispersion contains one or more polymers made from a monomer mix that includes one or more substituted-alkyl (meth)acrylates, such as, for example, acetoacetoxyalkyl (meth)acrylates. Suitable acetoacetoxyalkyl (meth)acrylates include, for example, acetoacetoxyethyl acrylate, acetoacetoxyethyl methacrylate, acetoacetoxypropyl acrylate, acetoacetoxypropyl methacrylate, acetoacetoxybutyl acrylate, acetoacetoxybutyl methacrylate, 2,3-di(acetoacetoxy) propyl acrylate, 2,3-di(acetoacetoxy) propyl methacrylate, and mixtures thereof.

In some embodiments, the aqueous polymer dispersion contains one or more polymers made from a monomer mix that includes allyl acetoacetate.

In some embodiments, the aqueous polymer dispersion contains one or more polymers made from a monomer mix that includes 0% or up to 40% by weight of at least one polar or polarizable nonionogenic hydrophilic monomer, based on the total weight of the monomer mix. Suitable polar or polarizable nonionogenic hydrophilic monomers include, for example, acrylonitrile, methacrylonitrile, cis- and trans-crotononitrile, alpha-cyanostyrene, alpha-chloroacrylonitrile, ethyl vinyl ether, isopropyl vinyl ether, isobutyl- and butyl-vinyl ether, diethylene glycol vinyl ether, decyl vinyl ether, vinyl acetate, isobornyl methacrylate; hydroxyalkyl (meth) acrylates such as 2-hydroxy ethyl methacrylate, 2-hydroxyethyl acrylate, 3-hydroxy propyl methacrylate, butanediol acrylate, 3-chloro-2-hydroxypropyl acrylate, 2-hydroxypropyl acrylate, 2-hydroxypropyl methacrylate; and vinyl thiols such as 2-mercaptopropyl methacrylate, 2-sulphoethyl methacrylate, methyl vinyl thiol ether, and propyl vinyl thio ether.

In some embodiments, the aqueous polymer dispersion contains one or more polymers made from a monomer mix that includes 0% or up to 10% by weight of at least one monomeric vinyl ester in which the acid moiety of the ester is selected from the aromatic acids and (C1 to C18) aliphatic acids, based on the total weight of the monomer mix. Such acids include formic, acetic, propionic, n-butyric, n-valeric, palmitic, stearic, phenyl acetic, benzoic, chloroacetic, dichloroacetic, gamma-chloro butyric, 4-chlorobenzoic, 2,5-dimethyl benzoic, o-toluic, 2,4,5-trimethoxy benzoic, cyclobutane carboxylic, cyclohexane carboxylic, 1-(p-methoxy phenyl)cyclohexane carboxylic, 1-(p-tolyl)-1-cyclopentane carboxylic, hexanoic, myristic, and p-toluic acids. The hydroxy vinyl moiety of the monomer may be selected from, for example, hydroxy vinyl compounds such as hydroxy ethylene, 3-hydroxy-pent-1-ene, 3,4-dihydroxybut-1-ene, and 3-hydroxy-pent-1-ene, it being understood that such derivation can be purely formal such as in the case of the vinyl acetate monomer in which the compound may be considered to be derived from acetic acid and hydroxy ethylene, although the monomer cannot in fact be prepared from such a precursor compound.

In some embodiments, the aqueous polymer dispersion of the present invention contains one or more polymers formed by emulsion polymerization. The process of emulsion polymerization is well known in the art. The practice of emulsion polymerization is discussed, for example, in detail in D. C. Blackley, Emulsion Polymerization (Wiley, 1975). In some embodiments, the latex polymers may also be formulated using internally plasticized polymer emulsions. Preparation of internally plasticized polymer emulsions is described in detail in U.S. Pat. No. 4,150,005 and the preparation of non-internally plasticized floor polish emulsion polymers is described in U.S. Pat. Nos. 3,573,239, 3,328,325, 3,554,790 3,467,610.

Conventional emulsion polymerization techniques as described above may be used to prepare the polymer latices. Thus the monomers may be emulsified with anionic or nonionic dispersing agents or emulsifiers; about 0.5% to 10% thereof on the weight of total monomers preferably being used. Acidic monomers are water soluble and thus serve as dispersing agents which aid in emulsifying the other monomers used. A polymerization initiator of the free radical type, such as ammonium or potassium persulphate, may be used alone or in combination with an accelerator, such as potassium metabisulphate or sodium thiosulphate. The initiator and accelerator, commonly referred to as catalysts, may be used in proportions of 0.1% to 2% each based on the weight of monomers to be copolymerized. The polymerization temperature may for example be from room temperature to 90 degrees C., or more, as is conventional.

Examples of emulsifiers which are suited to the polymerization process for emulsions include alkali metal and ammonium salts of alkyl, aryl, alkaryl and aralkyl sulphonates, sulphates and polyether sulphates, such as sodium vinyl sulphonate, and sodium methallyl sulphonate; the corresponding phosphates and phosphonates, such as phosphoethyl methacrylate; and alkoxylated fatty acids, esters, alcohols, amines, amides and alkylphenols.

Chain transfer agents, including mercaptans, polymercaptans and polyhalogen compounds are often desirable in the polymerization mixture to control polymer molecular weight.

In some embodiments in which a composition of the present invention is intended for use in a floor polish composition, the aqueous polymer dispersion contains at least one polymer with acid functional residues, and the aqueous polymer dispersion also contains at least one polyvalent metal ion. The polyvalent metal ion may be in the form of a solvated ion or in the form of an organometallic complex or in a combination thereof. Preferably, the polyvalent metal is a transition metal The amount of equivalents of polyvalent metal ion may be 25% to 110% of the equivalents of the acid functional residues in the polymer. In some embodiments, the amount of equivalents of polyvalent metal ion is 30% or more of the equivalents of acid functional residues in the polymer, or 50% or more. Independently, in some embodiments, the amount of equivalents of polyvalent metal ion is 100% or less of the equivalents of acid functional residues in the polymer.

Independently, in some embodiments, the aqueous polymer dispersion further contains at least one basic hydroxide or salt of an alkali metal, as taught in U.S. Pat. No. 4,517,330. When alkali metal is present, in some embodiments the molar ratio of polyvalent metal ion to alkali metal is from 1.0:0.25 to 1.0:2.0, or from 1.0:0.5 to 1.0:1.5.

The present invention involves the use of at least one surfactant. The surfactant may be present during the process of polymerizing the aqueous polymer dispersion (such surfactant is herein called "in-polymerization" surfactant), or additional surfactant (herein called "post-added" surfactant) may be added to the composition after the process of polymerizing the aqueous polymer dispersion is complete. Among embodiments in which additional surfactant is added to the composition after the process of polymerizing the aqueous polymer dispersion is complete, such additional surfactant may be the same as or different from any or all of the surfactant or surfactants present during the polymerization of the aqueous polymer dispersion.

Suitable surfactants include anionic surfactants, cationic surfactants, amphoteric surfactants, nonionic surfactants, and mixtures thereof. In embodiments involving the use of two or more surfactants, the surfactants are preferably chosen to be compatible with each other. Among the suitable surfactants are the emulsifiers described herein above.

Also among the suitable surfactants are nonionic surfactants. Suitable nonionic surfactants include, for example, polyoxyalkylene surfactants, polyalkylene glycol esters, polyoxyethylene derivatives of fatty acid esters of polyhydric alcohols, fatty acid esters of polyalkoxylated polyhydric alcohols, polyalkoxylated natural fats and oils, polyalkylene oxide block copolymers, and mixtures thereof. Among the suitable polyoxyalkylene surfactants, some suitable examples are polyoxyethylene surfactants, including, for example, alcohol ethoxylates, alkylphenol ethoxylates, and mixtures thereof. Suitable alcohol ethoxylates have the structure $R-(OCH_2CH_2)_n-OH$, where R is a C6 to C18 aliphatic group that may be saturated or unsaturated and, independently, may be linear, branched, cyclic, or a combination thereof; and where n is 2 to 100. In some embodiments, R is octyl, lauryl, cetyl, stearyl, oleyl, or a mixture thereof. In some embodiments, R is lauryl. Independently, in some embodiments, n is 5 or higher; or 10 or higher. Independently, in some embodiments, n is 30 or less, or 25 or less.

Among embodiments in which a post-added surfactant is used, the total amount of surfactant in the aqueous composition of the present invention, including all in-polymerization surfactants and all post-added surfactants, is 1.2 to 10 parts by weight of all surfactants, based on 100 weight parts of solids of all polymers in the aqueous composition. In some embodiments, the amount of post-added surfactant is 0.25 or more parts by weight, based on 100 weight parts of solids of all polymers in the aqueous composition; or 0.5 or more parts by weight; or 0.75 or more parts by weight; or 1 or more parts by weight. Independently, in some embodiments, the amount of post-added surfactant is 10 or less parts by weight, based on 100 weight parts of solids of all polymers in the aqueous composition; or 8 or less parts by weight.

In some embodiments, the amount of in-polymerization surfactant is 0.25 or more parts by weight, based on 100 weight parts of solids of all polymers in the aqueous composition; or 0.5 or more parts by weight; or 0.75 or more parts by weight. Independently, in some embodiments, the amount of in-polymerization surfactant is 10 or less parts by weight, based on 100 weight parts of solids of all polymers in the aqueous composition; or 5 or less parts by weight; or 2 or less parts by weight; or 1.15 or less parts by weight.

In some embodiments in which a post-added surfactant is used, one or more in-polymerization surfactant is selected from nonionic surfactants, anionic surfactants, and mixtures thereof, and one or more post-added surfactant is independently selected from anionic surfactants, nonionic surfactants, and mixtures thereof. In some embodiments, one or more anionic surfactants are used as in-polymerization surfactant, and one or more nonionic surfactants are used as post-added surfactant.

The ingredients of the composition of the present invention may be mixed in any order, using any method. In some embodiments, at least one surfactant is mixed with at least one ester (b), and the resulting ester-surfactant mixture is then mixed with at least one aqueous polymer dispersion. In some of such embodiments, the weight ratio of surfactant to ester (b) in the ester-surfactant mixture is 0.01 or higher, or 0.02 or higher, or 0.04 or higher. Independently, in some of such embodiments, the weight ratio of surfactant to ester (b) in the ester-surfactant mixture (b) is 2 or lower, or 1.5 or lower, or 1 or lower.

In some embodiments of the present invention, it is contemplated that the composition of the present invention is made without the presence of any one or any combination of the following ingredients (herein called "formulating ingredients"): alkali swellable resins, alkali soluble resins, diethylene glycol monoethyl ether, diethylene glycol monomethyl ether, dipropylene glycol monoethyl ether, dipropylene glycol monomethyl ether, Texanol, wax emulsions, and defoamers. In some embodiments, the composition of the present invention contains none of the above-mentioned formulating ingredients.

Independently, in some embodiments of the present invention, it is contemplated that the composition of the present invention is made without the presence of any one or any combination of the following ingredients (herein called "enhancement ingredients"): dyes, pigments, thickeners, and dispersants. In some embodiments, the composition of the present invention contains none of the above-mentioned enhancement ingredients.

Independently, in some embodiments, the composition of the present invention is made without the presence of any of the above-mentioned formulating ingredients and without the presence of any of the above-mentioned enhancement ingredients.

In some embodiments of the present invention, it is contemplated that the composition will be made and stored as an ingredient that is intended to be used at a later time by admixing the composition of the present invention with further ingredients. Such further ingredients may be, for example, one or more formulating ingredients, one or more enhancement ingredients, one or more other ingredients, or a mixture thereof.

In some embodiments, after a composition of the present invention is mixed with further ingredients, the resulting formulation is suitable for use as a coating. Depending on the choices made for each of the ingredients, the resulting formulation may be suitable, for example, as a paint, a paper coating, a floor polish, or other type of coating.

For example, in some of the embodiments in which the composition of the present invention is intended to be used as an ingredient in a floor polish, the composition of the present invention will be made and then later admixed with further ingredients including (but not limited to) one or more of any one of (or any combination of) the following: an alkali swellable emulsion or alkali soluble emulsion; a fluorine-type surfactant (in addition to any surfactants already present in the composition of the present invention); one or more dialkyl glycol monoalkyl ethers; a coalescent (for example, Texanol); a wax emulsion; and a defoamer.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated. As a further, independent, example, if a particular parameter is disclosed to have suitable minima of 1, 2, and 3, and if that parameter is disclosed to have suitable maxima of 9 and 10, then all the following ranges are contemplated: 1 to 9, 1 to 10, 2 to 9, 2 to 10, 3 to 9, and 3 to 10.

EXAMPLES

In the examples below, some compounds include the group herein called "iso-C9H17O," which has the following structure:

$$-\overset{O}{\underset{}{C}}-CH_2-CH\overset{CH_3}{\underset{}{|}}-CH_2-\overset{CH_3}{\underset{CH_3}{\overset{|}{C}}}-CH_3$$

In the examples below, the following ingredients were used:

Compound M1=(iso-C9H17O)—O—CH$_2$CH$_2$—O—CH$_2$CH$_2$—OH
Compound D1=(iso-C9H17O)—O—CH$_2$CH$_2$—O—CH$_2$CH$_2$—O-(iso-C9H17O)
Blend 1=mixture of 60% M1 and 40% D1 by weight
Blend 3=mixture of 79% M1 and 21% D1 by weight Duraplus™3 emulsion=acrylic aqueous polymer dispersion from Rohm and Haas Co.
LipoCol™ LA-23 surfactant=polyoxyethylene monolauryl ether, from Lipo Chemicals Co., (supplied as a solution of 75% surfactant and 25% water)
Primal™ 1531B emulsion=acrylic polymer emulsion from Rohm and Haas Co.
Rodin™ S-100 surfactant=fluorine-type surfactant from Ciba Specialty Chemicals
Duraplus™ 2 emulsion=acrylic aqueous polymer dispersion from Rohm and Haas Co.
E-4000=wax emulsion from TOHO Chemical Industry Co.
FS Antifoam 013=defoamer from Dow Corning Co.

Binary Mixtures BM1-BM6

Lipocol™ LA-23 surfactant, as supplied, was mixed with esters, with stirring, in the amounts shown below, to make binary mixtures:

| Binary Mixture # | Ester | Ratio[1] |
|---|---|---|
| BM1 | Blend 1 | 0.75 |
| BM2 | Blend 1 | 0.325 |
| BM3 | Blend 1 | 0.1 |
| BM4 | Blend 1 | 0.05 |
| BM5 | Blend 2 | 0.1 |
| BM6 | Blend 2 | 0.075 | note
[1]ratio of weight of surfactant (ignoring the weight of water) to weight of ester.

Pre-Mixtures P1-P6 and Comparative Pre-Mixture CP7

Ester was added to Duraplus™ 3 emulsion polymer, dropwise with stirring. The ester was added either as Blend 1 or as one of the binary mixtures BM1-BM6. The amount of ester or binary mixture was chosen in each case to give 10 weight percent of ester, based on the weight of polymer solids, in the resulting pre-mixture. The resulting pre-mixtures were examined visually for the presence of gel, with the results as follows:

| Pre-Mixture # | Ester | gel observed? |
|---|---|---|
| P1 | BM1 | no |
| P2 | BM2 | no |
| P3 | BM3 | no |
| P4 | BM4 | no |
| P5 | BM5 | no |
| P6 | BM6 | no |
| CP7 | Blend 1 | Yes |

The comparative pre-mixture, made by mixing ester directly with Duraplus™ 3, showed undesirable gel, while the pre-mixtures P1-P6 did not show gel.

Formulations F1-F6 and Comparative Formulation CF7:

Example formulations and comparative formulation could be made as follows:

| Ingredient | Formulations F1-F6 | Comparative Formulation CF7 |
|---|---|---|
| Water (g) | 43.51 | 43.51 |
| Primal ™ 1531B emulsion (g) | 2.39 | 2.39 |

-continued

| Ingredient | Formulations F1-F6 | Comparative Formulation CF7 |
|---|---|---|
| Rodin ™ S-100 surfactant (g) | 1.47 | 1.47 |
| Diethylene glycol monoethyl ether (g) | 3.64 | 3.64 |
| Dipropylene glycol monomethyl ether (g) | 1.73 | 1.73 |
| Texanol (g) | 0.84 | 0.84 |
| Conventional leveling agent | none | Tributoxyethyl phosphate, 1.17 g |
| Aqueous polymer dispersion | Pre-Mix P1-P6, 39.53 g | Duraplus ™ 2 emulsion, 38.36 g |
| E-4000 (g) | 6.84 | 6.84 |
| FS Antifoam 013 (g) | 0.02 | 0.02 |

Using the formulation in the table above, six formulations could be made, F1 through F6, using Pre-Mix P1 through P6, respectively. These could be compared to Comparative formulation CP7, made with conventional leveling agent, as shown in the table above. Such formulations would be useful as floor polishes, and they could be tested for floor polish quality. Such testing would show the following results:

| Property | F1 through F6 | CF7 |
|---|---|---|
| Mop Handling Ability | Good | Fair |
| Leveling Ability | Good | Good |
| Gloss | Good | Good |
| Heel Mark Resistance | Good | Good |

The formulations F1 through F6 would have floor polish properties as good as or better than the properties of CF7.

We claim:

1. A composition comprising
  (a) at least one aqueous polymer dispersion,
  (b) at least one ester in the amount of 0.005 to 50 parts by weight of said ester, based on 100 weight parts of solids of all polymers in said aqueous composition, wherein said ester is selected from the group consisting of
    (i) a monoester of a C7-C10 aliphatic monocarboxylic acid with a dihydric alcohol,
    (ii) a monoester of a C7-C10 aliphatic monocarboxylic acid with a trihydric alcohol,
    (iii) a diester of a C7-C10 aliphatic monocarboxylic acid with a trihydric alcohol, and
    (iv) a mixture of two or more of said (i), (ii), and (iii), and
  (c) at least one surfactant, in the amount of 1.2 to 10 parts by weight of said surfactant, based on 100 weight parts of solids of all polymers in said aqueous composition.

2. The composition of claim 1, wherein said aqueous polymer dispersion comprises at least one polymer containing acid functional residues, and wherein said aqueous composition further comprises at least one polyvalent metal ion, wherein the amount of equivalents of said polyvalent metal ion is 25% to 110% of the equivalents said acid functional residues.

3. The composition of claim 1, wherein said monocarboxylic acid comprises at least one C8-C9 aliphatic monocarboxylic acid.

4. The composition of claim 1, wherein said dihydric alcohol is selected from the group consisting of ethylene glycol, diethylene glycol, and triethylene glycol; and wherein said trihydric alcohol is selected from the group consisting of glycerol and trimethylol propane.

5. The composition of claim 1, wherein said surfactant comprises at least one nonionic surfactant, in the amount of 0.25 to 9.75 parts by weight, and at least one anionic surfactant, in the amount of 0.25 to 9.75 parts by weight, based on 100 weight parts of solids of all polymers in said aqueous composition.

6. A method of making a composition comprising
  (A) making an ester-surfactant mixture comprising at least one ester and at least one surfactant, wherein the weight ratio of said surfactant to said ester is from 0.01 to 2, and wherein said ester is selected from the group consisting of
    (i) a monoester of a C7-C10 aliphatic monocarboxylic acid with a dihydric alcohol,
    (ii) a monoester of a C7-C10 aliphatic monocarboxylic acid with a trihydric alcohol,
    (iii) a diester of a C7-C10 aliphatic monocarboxylic acid with a trihydric alcohol, and
    (iv) a mixture of two or more of said (i), (ii), and (iii); and
  (B) admixing said ester-surfactant mixture with at least one aqueous polymer dispersion,
wherein the amount of said ester in said composition is 0.005 to 50 parts by weight, based on 100 weight parts of solids of all polymers in said aqueous composition.

7. The method of claim 6, wherein said aqueous polymer dispersion comprises at least one polymer containing acid functional residues, and wherein said aqueous composition further comprises at least one polyvalent metal ion, wherein the amount of equivalents of said polyvalent metal ion is 25% to 110% of the equivalents said acid functional residues.

8. The method of claim 6, wherein said monocarboxylic acid comprises at least one C8-C9 aliphatic monocarboxylic acid, and wherein said dihydric alcohol is selected from the group consisting of ethylene glycol, diethylene glycol, and triethylene glycol; and wherein said trihydric alcohol is selected from the group consisting of glycerol and trimethylol propane.

9. The method of claim 6, wherein said surfactant comprises at least one nonionic surfactant.

10. A method of making a floor polish composition comprising admixing a composition made by the method of claim 6 with one or more ingredients selected from the group consisting of alkali swellable resins, alkali soluble resins, diethylene glycol monoethyl ether, diethylene glycol monomethyl ether, dipropylene glycol monoethyl ether, dipropylene glycol monomethyl ether, Texanol, wax emulsions, and defoamers.

* * * * *